(12) United States Patent
Lockridge et al.

(10) Patent No.: US 9,023,482 B2
(45) Date of Patent: May 5, 2015

(54) PRIMER LAYER FOR MULTILAYER OPTICAL FILM

(75) Inventors: James E. Lockridge, St. Paul, MN (US); Hang K. Loi, Woodbury, MN (US); Mark J. Pellerite, Woodbury, MN (US); Jeffrey A. Peterson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 443 days.

(21) Appl. No.: 12/935,400

(22) PCT Filed: Mar. 27, 2009

(86) PCT No.: PCT/US2009/038508
§ 371 (c)(1),
(2), (4) Date: Sep. 29, 2010

(87) PCT Pub. No.: WO2009/123921
PCT Pub. Date: Oct. 8, 2009

(65) Prior Publication Data
US 2011/0019280 A1  Jan. 27, 2011

Related U.S. Application Data

(60) Provisional application No. 61/040,737, filed on Mar. 31, 2008.

(51) Int. Cl.
*C08J 7/04* (2006.01)
*B32B 23/08* (2006.01)
(Continued)

(52) U.S. Cl.
CPC .................. *C08J 7/047* (2013.01); *B32B 23/08* (2013.01); *B32B 27/308* (2013.01); *B32B 27/281* (2013.01); *B32B 27/32* (2013.01); *B05D 2508/00* (2013.01);
(Continued)

(58) Field of Classification Search
None
See application file for complete search history.

(56) References Cited

U.S. PATENT DOCUMENTS 3,907,736 A    9/1975  Barton et al.
4,252,885 A *  2/1981  McGrail et al. ............... 430/160
(Continued)

FOREIGN PATENT DOCUMENTS

EP  0423951 A2    9/1990
EP  0 709 419   *  5/1996
(Continued)

OTHER PUBLICATIONS

Kuo et al., 1993, *European Polymers Paint Colour Journal*, 183(4336):445-448 "Waterborne Coatings Based on Sulfonated Polyester Resins".

(Continued)

*Primary Examiner* — Vivian Chen
(74) *Attorney, Agent, or Firm* — Jeffrey M. Olofson

(57) ABSTRACT

Disclosed herein is an optical article including a multilayer optical film and a primer layer disposed on the multilayer optical film. The primer layer consists essentially of a sulfopolyester and a crosslinker. The multilayer optical film may be a reflective film, a polarizer film, a reflective polarizer film, a diffuse blend reflective polarizer film, a diffuser film, a brightness enhancing film, a turning film, a mirror film, or a combination thereof. A microstructured or unstructured optical layer may be disposed on the primer layer opposite the multilayer optical film. Also disclosed herein is a method of making the optical article. Also disclosed herein is a display device including the optical article.

12 Claims, 1 Drawing Sheet

(51) Int. Cl.
| | | |
|---|---|---|
| B32B 27/30 | (2006.01) | |
| B32B 27/28 | (2006.01) | |
| B32B 27/32 | (2006.01) | |
| C08K 5/00 | (2006.01) | |
| C08J 7/06 | (2006.01) | |
| B05D 3/12 | (2006.01) | |
| C08G 63/688 | (2006.01) | |
| B32B 27/34 | (2006.01) | |
| B32B 27/36 | (2006.01) | |
| B32B 3/00 | (2006.01) | |
| C09D 167/03 | (2006.01) | |
| B05D 5/10 | (2006.01) | |
| C09D 5/00 | (2006.01) | |
| G02B 5/30 | (2006.01) | |

(52) U.S. Cl.
CPC ............... C08K 5/0025 (2013.01); C08J 7/06 (2013.01); B05D 3/12 (2013.01); C08G 63/6886 (2013.01); C08G 63/6884 (2013.01); B32B 27/34 (2013.01); B32B 27/36 (2013.01); B32B 3/00 (2013.01); C09D 167/03 (2013.01); B05D 5/10 (2013.01); B05D 2201/02 (2013.01); C09D 5/002 (2013.01); B32B 27/365 (2013.01); C08J 2467/00 (2013.01); G02B 5/305 (2013.01)

(56) References Cited

U.S. PATENT DOCUMENTS

| | | | | |
|---|---|---|---|---|
| 4,476,189 | A * | 10/1984 | Posey et al. | 428/336 |
| 4,480,085 | A | 10/1984 | Larson | |
| 4,493,872 | A * | 1/1985 | Funderburk et al. | 428/332 |
| 4,525,419 | A * | 6/1985 | Posey et al. | 428/336 |
| 4,585,687 | A * | 4/1986 | Posey et al. | 428/195.1 |
| 4,605,591 | A | 8/1986 | Nose et al. | |
| 4,704,325 | A * | 11/1987 | Crocker | 428/323 |
| 4,783,497 | A | 11/1988 | Thompson | |
| 4,824,725 | A * | 4/1989 | Thoese | 428/336 |
| 4,845,189 | A * | 7/1989 | Rudd et al. | 528/272 |
| 4,847,334 | A | 7/1989 | Thompson | |
| 4,876,155 | A * | 10/1989 | Thoese et al. | 428/480 |
| 4,921,764 | A * | 5/1990 | Rudd et al. | 428/480 |
| 4,971,863 | A * | 11/1990 | Hart | 428/458 |
| 5,356,989 | A * | 10/1994 | Tachika et al. | 524/608 |
| 5,380,590 | A * | 1/1995 | Nakamura et al. | 428/375 |
| 5,391,429 | A * | 2/1995 | Otani et al. | 428/327 |
| 5,427,835 | A | 6/1995 | Morrison et al. | |
| 5,496,647 | A * | 3/1996 | Krejci et al. | 428/480 |
| 5,498,670 | A * | 3/1996 | Aoyama et al. | 525/217 |
| 5,510,417 | A * | 4/1996 | Tachika et al. | 524/608 |
| 5,545,713 | A * | 8/1996 | Krejci et al. | 528/295 |
| 5,610,001 | A * | 3/1997 | Mostaert et al. | 430/533 |
| 5,882,774 | A * | 3/1999 | Jonza et al. | 428/212 |
| 6,165,602 | A * | 12/2000 | Fujita | 428/216 |
| 6,368,699 | B1 * | 4/2002 | Gilbert et al. | 428/212 |
| 6,824,849 | B2 * | 11/2004 | Herzog et al. | 428/40.1 |
| 6,827,886 | B2 | 12/2004 | Neavin et al. | |
| 6,828,010 | B2 * | 12/2004 | Kubota et al. | 428/213 |
| 6,893,731 | B2 * | 5/2005 | Kausch | 428/483 |
| 6,906,888 | B1 * | 6/2005 | Trabert et al. | 360/77.13 |
| 6,953,623 | B2 * | 10/2005 | Olson et al. | 428/412 |
| 7,271,951 | B2 | 9/2007 | Weber et al. | |
| 7,348,066 | B2 * | 3/2008 | Chien et al. | 428/517 |
| 7,521,126 | B2 * | 4/2009 | Taki et al. | 428/480 |
| 7,670,740 | B2 * | 3/2010 | Wu et al. | 430/66 |
| 7,833,621 | B2 | 11/2010 | Jones | |
| 2003/0211346 | A1 | 11/2003 | Kausch | |
| 2005/0122587 | A1 * | 6/2005 | Ouderkirk et al. | 359/490 |
| 2005/0175827 | A1 * | 8/2005 | Hebrink et al. | 428/212 |
| 2005/0259326 | A1 * | 11/2005 | Weber et al. | 359/589 |
| 2006/0093845 | A1 * | 5/2006 | Chien et al. | 428/520 |
| 2006/0145127 | A1 * | 7/2006 | Lockridge | 252/500 |
| 2006/0228559 | A1 * | 10/2006 | Denker et al. | 428/412 |

FOREIGN PATENT DOCUMENTS

| | | | |
|---|---|---|---|
| JP | 63-033419 | * | 2/1988 |
| JP | 06-145394 | * | 5/1994 |
| JP | 07-144361 | * | 6/1995 |
| JP | 08-295792 | * | 11/1996 |
| WO | WO 92/17531 | * | 10/1992 |
| WO | WO 02/053379 | | 7/2002 |
| WO | WO 2004/060946 | | 7/2004 |
| WO | WO 2005/116915 | | 12/2005 |
| WO | WO 2008/137272 | | 11/2008 |

OTHER PUBLICATIONS

PCT International Search Report for PCT/US2009/038508 mailed Jul. 31, 2009.
Supplementary European Search Report, EP Application No. 09726755, dated Feb. 2, 2012.

* cited by examiner

PRIMER LAYER FOR MULTILAYER OPTICAL FILM

CROSS REFERENCE TO RELATED APPLICATIONS

This application is a national stage filing under 35 U.S.C. 371 of PCT/US2009/038508, filed Mar. 27, 2009, which claims priority to Provisional Application No. 61/040,737, filed Mar. 31, 2008, the disclosure of which is incorporated by reference in its/their entirety herein.

FIELD OF THE INVENTION

This invention relates to coatings for optical films, and particularly to primer layers for multilayer optical films.

BACKGROUND

A problem often encountered in the polymer film art relates to the difficulty of providing strong adhesion between substrates and functional coatings applied to them. This is particularly so in the case of polyester-based substrates. To deal with the problem, a primer layer or coating is generally applied to the polyester substrate to improve adhesion between the substrate and the functional coating. A particularly difficult adhesion problem is often encountered in the manufacture of optical films having a microstructured surface layer disposed on a multilayer optical film. The microstructured surface layer is formed by coating a UV-curable acrylic resin on the multilayer optical film followed by curing the resin against a microstructured roll.

SUMMARY

Disclosed herein is an optical article comprising: a multilayer optical film, and a primer layer disposed on the multilayer optical film, the primer layer consisting essentially of a sulfopolyester and a crosslinker. In some embodiments, the multilayer optical film comprises a reflective film, a polarizer film, a reflective polarizer film, a diffuse blend reflective polarizer film, a diffuser film, a brightness enhancing film, a turning film, a mirror film, or a combination thereof. In some embodiments, a microstructured layer may be disposed on the primer layer opposite the multilayer optical film. Also disclosed herein is a method of making the optical article. Also disclosed herein is a display device comprising the optical article.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

Disclosed herein is a primer layer that may be used to facilitate adhesion between a multilayer optical film and another layer. For example, the primer layer is useful for adhering polyester-based multilayer optical films to layers made from radiation-cured materials. Radiation-cured materials comprise non-halogenated and halogenated materials. The primer layer may also be advantageous because it can be formed from an aqueous-based composition as opposed to a solvent-based composition, and is free of organohalogen functionality.

The primer layer disclosed herein is also advantageous from a manufacturing standpoint. In a typical manufacturing process for a multilayer optical film, the film may be tentered or stretched in one or two dimensions in order to orient the film. The primer layer disclosed herein may be formed on the multilayer optical film before tentering or stretching. This pre-tenter primer treatment is desirable from a processing standpoint since it eliminates the need for a separate coating step. In contrast, many known materials used to promote adhesion, including polymers and particles, are not amenable to tentering, which can include high temperatures and stretch ratios anywhere from 2:1, 4.5:1, or even 6:1 or greater.

Yet another advantage is that the primer layer disclosed herein can be designed to exhibit desirable optical properties such as low haze and high light transmission. For example, when the primer layer is formed on a suitable multilayer optical film, the film can exhibit minimum haze, such as less than about 10%, less than 5%, or less than 1%. This is generally difficult to achieve with known primer compositions because, in some cases, sufficient adhesion can only be achieved either with thick layers that impart undesirable levels of haze, or with coatings that fracture when the film substrate is stretched. Another source of undesirable haze is surface roughness, which can arise from drying-related phenomena such as mottle and dewetting, and fracturing of the coating upon tentering. These problems can be particularly serious when using water-based coating formulations, due for example to surface tension gradients that occur during the drying process. If desired, when the primer layer is formed on a suitable multilayer optical film, the film can exhibit maximum light transmission, such as greater than 90%. Generally, the coated multilayer optical film is desirably colorless. By having these properties, the coated multilayer optical article is suitable for use in optical applications in which light can be managed, enhanced, manipulated, controlled, maintained, transmitted, reflected, refracted, absorbed, etc. Optical applications are described below in more detail.

Figure 1:
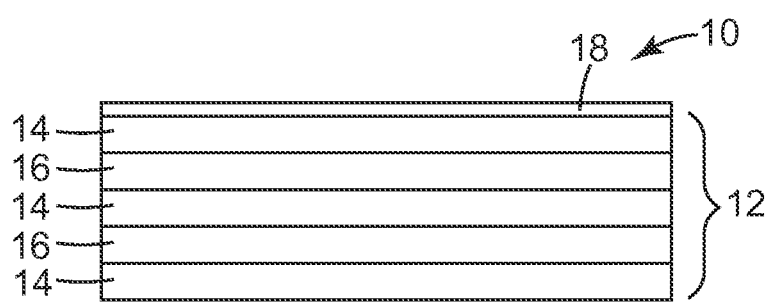
FIGS. 1 and 2 show schematic cross sectional views of exemplary optical articles.

FIG. 1 shows a cross sectional view of an exemplary optical article disclosed herein. Optical article 10 comprises multilayer optical film 12 comprising a plurality of alternating layers of first and second optical layers, 14 and 16, respectively. Primer layer 18 is formed on an outer surface of the multilayer optical film. The primer layer can have any suitable thickness provided it can provide the desired adhesion without affecting optical properties. In general, the primer layer is thick enough to provide desired adhesion as described below, and thin enough so that it does not affect the optical properties of the optical article. In some embodiments, a thickness of from about 30 to about 500 nm is useful. In some embodiments, the primer layer has a thickness of from about 50 to about 250 nm, or from about 175 to about 225 nm.

The primer layer may have a Tg of at least about 50° C. If the Tg of the primer layer is too low, the layer may be tacky, and interlayer adhesion may be poor if the layer is too soft and easily dissolved by the subsequently overcoated UV-curable resin. If the Tg of the primer layer is too high, good film formation may not be obtained, and interlayer adhesion may be poor if the coating is too glassy to be penetrated or swelled by the overcoated UV-curable resin. ASTM D 3359 is a well known method used to measure adhesion between two layers.

The primer layer comprises a sulfonated polyester. As used herein, the term polyester refers to polyesters made from a single dicarboxylate monomer and a single diol monomer and also to copolyesters which are made from more than one dicarboxylate monomer and/or more than one diol monomer. In general, polyesters are prepared by condensation of the carboxylate groups of the dicarboxylate monomer with hydroxyl groups of the diol monomer. As used herein, the terms "dicarboxylate" and "dicarboxylic acid" are used interchangeably and include lower alkyl esters having from 1 to 10 carbon atoms. As used herein, diol monomers include those monomers having two or more hydroxyl groups, for example, diols, triols, tetraols, and pentaols. In general, useful sulfonated polyesters include those that are water soluble and those that are water dispersible. Useful sulfonated polyesters have a molecular weight high enough so that after coating, drying, and stretching, as described below, the resulting primer layer is not brittle. Molecular weights of from about 8000 to about 50000 may be useful. Amorphous sulfopolyesters described in U.S. Pat. No. 4,480,085 (Larson) may be useful. Sulfopolyesters described in U.S. Pat. No. 5,427,835 (Morrison et al.) may also be useful.

The sulfonated polyester comprises at least one dicarboxylate monomer having one or more pendant sulfonate groups. Pendant sulfonate groups are groups that do not participate in polymerization reactions that form the main backbone of polyesters. Examples of sulfonated dicarboxylate monomers include sulfonated derivatives of naphthalenedicarboxylic acid; terephthalic acid; phthalic acid; isophthalic acid; maleic acid; itaconic acid; azelaic acid; adipic acid; sebacic acid; succinic acid; glutamic acid; norbornenedicarboxylic acid; bicyclooctanedicarboxylic acid; 1,6-cyclohexanedicarboxylic acid; t-butylisophthalic acid; tri-mellitic acid; 4,4'-biphenyldicarboxylic acid; anthracenedicarboxylic acid; and tetradecanedicarboxylic acid. Any of the sulfonated dicarboxylate monomers can be substituted by groups having a molecular weight of less than about 80 and which are inert in the polymerization reaction. Examples of inert pendent groups include halogens, cyano, nitro, lower alkyl and alkoxy groups having from 1 to 4 carbon atoms, and phenyl groups. Additional dicarboxylate monomers are described in Larson. The pendant sulfonate groups may be introduced by grafting them onto side chains of a polyester, capping as end groups of a polyester, or including monomers having pendant sulfonated groups during polymerization to form the polyester.

In aqueous solution, each sulfonate group may be present in the form of the unneutralized sulfonic acid, or is associated with a counterion which may be an inorganic or an organic counterion. Examples of inorganic counterions include ammonium, sodium, potassium, lithium, zinc, magnesium, calcium, cobalt, iron, aluminum, and antimony counterions, and combinations thereof. Examples of organic counterions include C2-C20-containing counterions. Preferred organic counterions include mono-, di-, tri-, and tetraalkylammonium bearing alkyl substituents with independently 1 to 8 carbon atoms, substituted and unsubstituted phosphonium, and heterocyclic nitrogen-containing cations such as pyridinium, morpholinium, and imidazolium optionally substituted with alkyl groups containing 1 to 8 carbon atoms.

Useful sulfonated polyesters typically comprise at least two dicarboxylate monomers: one that is sulfonated as described above and one that is not. Unsulfonated dicarboxylate monomers that can be used include any of those described above for sulfonated derivatives.

The amount of sulfonated dicarboxylate monomer in the sulfonated polyester is not particularly limited. In general, some minimum amount of sulfonated dicarboxylate monomer is necessary so that the sulfonated polyester is water soluble or water dispersible as nanometer sized particles. Thus, the minimum amount of sulfonated dicarboxylate monomer may depend upon other monomers that make up the sulfonated polyester in addition to other factors such as molecular weight of the sulfonated polyester. The amount of sulfonated dicarboxylate monomer in the sulfonated polyester may need to be selected such that there are no incompatibility issues in the primer solution either before or after it is coated. In general, the primer solution may need to have a pot life of at least 24 hours, meaning that no changes are visible to the naked eye after a 24 hour period. In one example, the sulfonated polyester comprises 0.25 to 15 moles of sulfonated dicarboxylate monomer per 100 moles of combined dicarboxylate and diol monomers.

The sulfonated polyester may comprise one or more diol monomers. In general, aliphatic diols and glycols are useful; examples include 1,3-propanediol; 1,4-butanediol; 1,5-pentanediol; 1,6-hexanediol; 1,10-decanediol; trimethylolpropane; 2,3-dimethylolpropane; 1,4-dihydroxy-2,3-dimethylbutane; 1,4-cyclohexanedimethanol; 1,4-benzenedimethanol; neopentyl glycol; ethylene glycol; propylene glycol; polyethylene glycol; tricyclodecanediol; norbornane diol; bicyclo-octanediol; pentaerythritol; bisphenol A; and 1,3-bis(2-hydroxyethoxy)benzene. Polymeric diols such as poly(caprolactone)diol having a molecular weight of up to about 1000 may also be used. Additional diol monomers are described in Larson.

Particular examples of sulfonated polyesters include EASTEK 1100 (Eastman Chemical Co.) and those synthesized from condensation polymers of isophthalic acid and sodium sulfo-isophthalic acid, along with ethylene glycol, diethylene glycol and neopentyl glycol or 1,4-cyclohexane dimethanol. For example, useful sulfonated polyesters may comprise: one or more dicarboxylic acid monomers selected from the group consisting of sulfonated isophthalic acid, isophthalic acid, and terephthalic acid; and one or more diol monomers selected from the group consisting of ethylene glycol, diethylene glycol, neopentyl glycol, and 1,4-cyclohexane dimethanol. For another example, useful sulfonated polyesters may comprise 5-sodiosulfoisophthalic acid, terephalic acid, isophthalic acid, ethylene glycol, and neopentyl glycol.

The primer layer comprises a melamine-formaldehyde crosslinker which is typically a resin derived from melamine and formaldehyde. Particular examples of melamine-formaldehyde crosslinkers include CYMEL 301 and 327 (Cytec Industries). The crosslinker is used to improve mechanical stability, chemical durability to acrylate resins, and adhesion properties of the primer layer. The particular choice of crosslinker and the amount used depends on a variety of factors such as compatibility with other components in the primer layer either before or after it is coated and/or cured, the desired thickness of the primer layer, polymerization conditions, cost, etc.

The sulfopolyester and the crosslinker may be used in any relative amount provided the resulting primer layer has the desired properties. The relative amount may depend on the particular sulfopolyester and crosslinker used, as well as the thickness of the primer layer, and the intended use of the article. The relative amount may also need to be selected such that there are no incompatibility issues in the primer solution either before or after it is coated. In general, the primer solution may need to have a pot life of at least 24 hours, meaning that no changes due to phase separation, precipitation, or gelation are visible to the naked eye after a 24 hour period. The sulfopolyester and crosslinker must also be compatible in the primer layer. For example, a ratio of from 1:1 to 20:1 for the sulfopolyester to crosslinker may be used.

The primer layer may further comprise at least one catalyst or thermally- and/or photo-activated latent catalyst in order to facilitate curing and crosslinking Examples of useful acid and latent acid catalysts, particularly useful with melamine-formaldehyde-based crosslinkable systems, include p-toluenesulfonic acid and its derivatives, such as CYCAT 4040 and 4045 (Ciba Specialty Chemicals). Other examples of useful catalysts include mineral acids such as hydrochloric, phosphoric, and nitric acids, their amine salts, and carboxylic acids and their amine salts. Catalysts can also be polymeric species such as poly(acrylic acid) and its ammonium salts. Examples of useful photoactivated acid catalysts include iodonium and sulfonium salts of strong acids such as trifluoromethanesulfonic acid. In general, the amount of catalyst or catalyst precursor used is less than about 4 wt. % of the total coating solids.

The primer layer and coating composition may contain other types of additives. Preferably, such materials should be compatible with the primary components of the coating and coating formulation, and should not adversely affect performance attributes of the optical article. These include coating aids such as surfactants and coalescing solvents; defoaming agents; particulates used as, for instance, slip agents; antioxidants; and pH control agents such as buffers or trialkylamines. Use of relatively volatile trialkylamines such as triethylamine and dimethylethanolamine as pH stabilizers is particularly preferred for coating formulations comprising melamine-formaldehyde crosslinking agents, since pH drift into the acid range can cause undesirable shortened pot life and premature gelation.

Also disclosed herein is a method of making the primer article. The method comprises coating the primer composition described above onto a substrate, thereby forming a coated substrate. Typically, the components in the primer composition are dissolved, dispersed, or suspended in a suitable solvent for the coating step. The particular solvent used depends upon the particular components, the desired concentrations of the components, the desired thickness and nature of the layer, the coating method employed, etc. Suitable solvents include water. Generally, compositions used to form the primer layer comprise up to about 50 wt. % solids relative to the weight of the total composition.

The primer composition may be coated using a variety of coating techniques such as dip, roll, die, knife, air knife, slot, slide, wire wound rod, and curtain coating. A comprehensive discussion of coating techniques can be found in Cohen, E. and Gutoff, E. Modern Coating and Drying Technology; VCH Publishers: New York, 1992; p. 122; and in Tricot, Y-M. Surfactants: Static and Dynamic Surface Tension. In *Liquid Film Coating*; Kistler, S. F. and Schweizer, P. M., Eds.; Chapman & Hall: London, 1997; p. 99.

The primer composition can be cured using heat or UV radiation or any other suitable curing technique. One preferred method of curing is thermal activation and crosslinking of the primer coating using the latent heat of a film tentering process.

The multilayer optical film may comprise any of a variety of materials including polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycyclo-olefins; polyimides; glass; paper; or combinations or blends thereof. Particular examples include polyethylene terephthalate, polymethyl methacrylate, polyvinyl chloride, and cellulose triacetate. Preferable examples include polyethylene terephthalate, polyethylene naphthalate, cellulose triacetate, polypropylene, polyester, polycarbonate, polymethylmethacrylate, polyimide, polyamide, or a blend thereof. Preferably, the multilayer optical film is sufficiently resistant to temperature and aging such that performance of the article is not compromised over time. The thickness of the multilayer optical film is typically less than about 2.5 mm. The multilayer optical film may also be an orientable film such as a cast web substrate that is coated before orientation in a tentering operation.

The multilayer optical film is suitable for use in optical applications. Useful multilayer optical films are designed to control the flow of light. They may have a transmission of greater than about 90%, and a haze value of less than about 5%, for example, less than 2%, or less than 1%. Properties to consider when selecting a suitable multilayer optical film include mechanical properties such as flexibility, dimensional stability, self-supportability, and impact resistance. For example, the multilayer optical film may need to be structurally strong enough so that the article can be assembled as part of a display device.

The multilayer optical film may be used in a wide variety of applications such as graphic arts and optical applications. A useful multilayer optical film may be described as a reflective film, a polarizer film, a reflective polarizer film, a diffuse blend reflective polarizer film, a diffuser film, a brightness enhancing film, a turning film, a mirror film, or a combination thereof. The multilayer optical film may have ten or less layers, hundreds, or even thousands of layers, the layers being composed of some combination of all birefringent optical layers, some birefringent optical layers, or all isotropic optical layers. In one embodiment, the multilayer optical film has alternating layers of first and second optical layers, wherein the first and second optical layers have refractive indices along at least one axis that differ by at least 0.04. Multilayer optical films having refractive index mismatches are described in the references cited below. In another embodiment, the multilayer optical film may comprise one or more layers of any of the above multilayer optical films such that the primer layer is buried in any one of them, making the article itself a reflective film, a polarizer film, a reflective polarizer film, a diffuse blend reflective polarizer film, a diffuser film, a brightness enhancing film, a turning film, a mirror film, or a combination thereof.

Useful multilayer optical films include commercially available optical films marketed as Vikuiti™ Dual Brightness Enhanced Film (DBEF), Vikuiti™ Brightness Enhanced Film (BEF), Vikuiti™ Diffuse Reflective Polarizer Film (DRPF), Vikuiti™ Enhanced Specular Reflector (ESR), and Vikuiti™ Advanced Polarizing Film (APF), all available from 3M Company. Useful optical films are also described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO95/17692; WO 95/17699; WO 96/19347; WO 97/01440; WO 99/36248; and WO99/36262. These multilayer optical films are merely illustrative and are not meant to be an exhaustive list of suitable multilayer optical films that can be used. In some of these embodiments, the primer layer of this invention may be an internal layer in a multilayer film construction.

After the primer layer is formed on the multilayer optical film, the coated film can then be tentered or stretched in one or two dimensions in order to orient the film. The process of orienting film, particularly polyester films, is described in Volume 12 of *The Encyclopedia of Polymer Science and Engineering*, 2nd edition, pages 193 to 216. A typical process for fabricating biaxially oriented polyester films comprises four main steps: (1) melt extrusion of the polyester resin and quenching it to form a web, (2) drawing the web in the longitudinal or machine direction, (3) subsequently or simultaneously drawing the web in the transverse direction to create a film, and (4) heat setting the film. If biaxial orientation is desired, the primer composition may be coated on the multilayer optical film after it has been drawn in the machine direction but before it has been subsequently drawn in the transverse direction. Further discussion on the orientation of polymeric films can be found in WO 2006/130142 and the previously cited references on optical films. Multilayer optical films are typically produced in processes utilizing draw ratios in the range of 6:1 or greater, significantly higher than the 3.5:1-4:1 typically used in preparation of monolithic PET film. Unlike many primers used in the art, the primers of this invention have been found to yield coatings with excellent clarity, cosmetics, and adhesion properties even after draw at 6:1.

Figure 2:
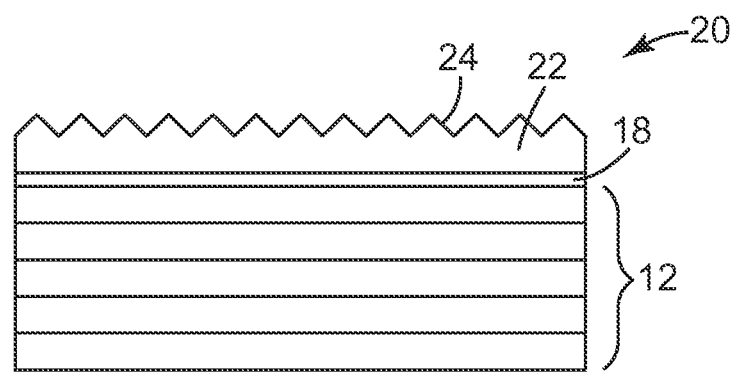

In some embodiments, the optical article comprises a brightness enhancing film. In this embodiment, a microstructured layer is disposed on the primer layer opposite the multilayer optical film, wherein the microstructured layer comprises a structured surface having a plurality of microstructures, and the structured surface comprises an outer surface of the article. FIG. 2 shows a schematic cross-section of such an exemplary optical article 20 having microstructured layer 22 disposed on primer layer 18. The microstructured layer has microstructured surface 24 that comprises an array of prisms for directing light. A comprehensive discussion of the behavior of light in a brightness enhancement film may be found, for example, in US 2007/0115407 A1 (Richard et. al).

In some embodiments, the optical article comprises a substrate disposed on the primer layer opposite the multilayer optical film. Examples of substrates include any of those useful in optical applications such as polyester, polycarbonate, poly(meth)acrylates, any of which may or may not be oriented.

The plurality of microstructures may comprise an array of prisms as shown in FIG. 2, or it may comprise a series of shapes including ridges, posts, pyramids, hemispheres and cones; and/or they may be protrusions or depressions having flat, pointed, truncated, or rounded parts; any of which may have angled or perpendicular sides relative to the plane of the surface. Any lenticular microstructure may be useful, for example, the microstructured surface may comprise cube corner elements, each having three mutually substantially perpendicular optical faces that typically intersect at a single reference point or apex. The microstructured surface may have a regularly repeating pattern, be random, or a combination thereof. In general, each microstructure has at least two lateral dimensions (i.e. dimensions in the plane of the film) less than 2 mm. The thickness of the microstructured layer can be from about 10 to about 200 um.

The microstructured layer may be prepared using a polymerizable composition, a master having a negative microstructured molding surface, and a multilayer optical film having the primer layer on it. The polymerizable composition can be deposited between the master and the primer layer, and a bead of the composition moved so that the composition fills the microstructures of the master. The polymerizable composition is polymerized to form the layer and is then separated from the master. The master can be metallic, such as nickel, nickel-plated copper or brass, or can be a thermoplastic material that is stable under the polymerizing conditions and that preferably has a surface energy that permits clean removal of the polymerized layer from the master. The master is further described in U.S. Pat. No. 4,542,449; U.S. Pat. No. 5,771,328; and U.S. Pat. No. 6,354,709. Alternatively, a pre-formed microstructured layer may be prepared and laminated to the primed multilayer optical film such that the primer layer is disposed between the microstructured layer and the multilayer optical film.

The polymerizable composition used to form the microstructured layer may comprise monomers including mono-, di-, or higher functional monomers, and/or oligomers, and preferably, those having a high index of refraction, for example, greater than about 1.4 or greater than about 1.5. The monomers and/or oligomers may be polymerizable using UV radiation. Suitable materials include (meth)acrylates, for example, those described in U.S. Pat. Nos. 4,568,445; 4,721,377; 4,812,032; 5,424,339; and 6,355,754.

The optical article may be used in a graphic arts application, for example, in backlit signs, billboards, and the like. The optical article may also be used in a display device comprising, at the very least, one or more light sources and a display panel. The display panel may be of any type capable of producing images, graphics, text, etc., and may be mono- or polychromatic, or transmissive or reflective. Examples include a liquid crystal display panel, a plasma display panel, or a touch screen. The light sources may comprise fluorescent lamps, phosphorescent lights, light emitting diodes, or combinations thereof. Examples of display devices include televisions, monitors, laptop computers, and handheld devices such as cell phones, PDAs, calculators, and the like.

The invention may be more completely understood in consideration of the following examples.

EXAMPLES

Materials

All chemicals were obtained from commercial sources and used as received unless otherwise noted. Surfactant TOMADOL 25-9 was obtained from Tomah Chemical Co. Crosslinkers CYMEL 301, CYMEL 327, and catalyst CYCAT 4040 were obtained from Cytec Industries Inc. Polyethyleneimine crosslinker EPOMIN SP012 was obtained from Aceto Corp. Polyisocyanate crosslinker STAHL XR5305 and carbodiimide crosslinker STAHL XR5577 were obtained from Stahl International. Aziridine crosslinker CX-100 was obtained from DSM Neoresins. Acrylate/melamine-formaldehyde dispersion RHOPLEX 3208 was obtained from Rohm and Haas Co.; this dispersion comprised about 34-35 wt % of an acrylic binder, and about 8-9 wt % of a formaldehyde-melamine crosslinker. Bisphenol A epoxy diacrylate (CN120) was obtained from Sartomer. All crosslinkers were used as a 20 wt. % dilution in water except for CYMEL 301 which was used as a 20 wt. % dilution in isopropanol. CYTEC 4045 was used as a 10 wt. % dilution in water.

Sulfopolyester A (SPA)

Sulfopolyester A was prepared as follows. A one gallon polyester kettle was charged with 111.9 g (5.5 mol %) 5-sodiosulfoisophthalic acid, 592.1 g (47.0 mol %) terephthalic acid, 598.4 g (47.5 mol %) isophthalic acid, 705.8 g ethylene glycol, 599 g neopentyl glycol, 0.7 g antimony oxide, and 2.5 g sodium acetate. The mixture was heated with stirring to 230

C at 345 kPa (50 psi) under nitrogen for 2 hours, during which time water evolution was observed. The temperature was increased to 250 C and the pressure was then reduced, vacuum was applied (0.2 torr), and the temperature was increased to 270 C. The viscosity of the material increased over a period of 45 minutes, after which time a high molecular weight, clear, viscous sulfopolyester was drained. This sulfopolyester was found by DSC to have a Tg of 70.3 C. The theoretical sulfonate equivalent weight was 3847 g polymer per mole of sulfonate. 500 g of the polymer was dissolved in a mixture of 2000 g water and 450 g isopropanol at 80 C. The temperature was then raised to 95 C in order to remove the isopropanol (and a portion of the water). The final dispersion consisted of an aqueous 12 wt. % solids dispersion of Sulfopolyester A.

Sulfopolyester B (SPB)

EASTEK 1100 from Eastman Chemical Co. consisted of an approximately 30 wt. % aqueous dispersion of Sulfopolyester B.

Sulfopolyester C (SPC)

Sulfopolyester C consisted of 12 wt. % aqueous dispersion of a mixture of Sulfopolyesters A and B at a weight ratio of 91:9.

Example 1

Example 1 was prepared as an aqueous solution consisting of Sulfopolyester C at 12 wt. %, CYMEL 301 at 3.6 wt. % (30 wt. % with respect to sulfopolyester solids), CYCAT 4045 at 0.05 wt. % (1.5 wt. % with respect to CYMEL 301), and TOMADOL 25-9 at 0.15 wt. %, all relative to the total amount of the aqueous solution. Mixing order was as follows: water, surfactant, binder, crosslinker, and catalyst. Solutions were thoroughly mixed between each addition.

The solution was coated on a cast polyester multilayer optical film using a #3 wire-wound rod. After coating, the film was dried at 80° C. for 2 minutes. The multilayer optical film was prepared as described in US 2001/0013668 (Neavin et al.). The coated multilayer optical film was then preheated at 160° C. and then stretched with a transverse draw ratio of 6.5:1 at a constant rate of 50%/second.

A radiation-curable composition was used to form a microstructured layer on the primer layer of the coated multilayer optical film. The radiation-curable composition consisted of phenoxyethylacrylate at 25 wt. %, bisphenol A epoxy diacrylate (CN120) at 75 wt. %, LUCIRIN TPO at 0.5 wt. %, and DAROCUR 1173 at 0.5 wt. %. This composition was coated and cured to form the microstructured layer using the following procedure:

1) Heat the coated film at 140° C. for 1 minute.
2) Heat a flat microstructured stainless steel tool on a hot plate at 140° C.
3) Heat a PL1200 laminator (Professional Laminating Systems, Inc.) to 140° C. and set speed to 5.1 mm/sec (10 in/min).
4) Apply a bead line of radiation-curable composition, pre-heated to 140° C., to the tool.
5) Using a hand roller, gently place the coated side of the PET film against the tool and roll to tack in place.
6) Sandwich the tool+film sample between two larger pieces of unprimed PET film to protect the laminator rolls.
7) Run sample through the laminator. This gives a total resin film thickness of 25 um (1 mil).
8) Pass sample through a UV processor (UV Fusion Lighthammer equipped with a 300 W D-bulb and operating at 100% power and 15 cm/sec (30 ft/min) line speed under nitrogen purging.
9) Gently remove film sample from tool.

Examples 2-4 and Comparative Examples 1-8 (C1-C8)

Examples 2-4 and C1-C8 were prepared as described for Example 1 except that the materials as described in Table 1 were used.

Test Methods

Pot life: After 24 hours, the coating solutions were evaluated for signs of instability.

Visual after stretch: The samples were evaluated for defects and surface haze. Lower numbers indicate better performance.

Tool removal: A qualitative assessment was made as the cured microstructured surface was peeled away from the flat tool. Good adhesion to the substrate enables the structure to be pulled away from the tool without leaving strings of cured resin adhered between the substrate and the tool. In Table 1, 0 indicates some strings and 1 indicates no strings, leaving the tool clean of all cured resin.

Adhesion was measured according to ASTM D 3359, a crosshatch tape pull test using 3M™ 610 cellophane tape from 3M Company. The amount of resin remaining adhered to the substrate was determined.

TABLE 1

| Ex. | Binder | Crosslinker | Crosslinker Type | 24 Hour Pot Life | Visual After Stretch | Tool Removal | Crosshatch Adhesion (%) |
|---|---|---|---|---|---|---|---|
| 1 | SPC | CYMEL 301 | melamine formaldehyde | NC[1] | 1 | 0 | 10 |
| 2 | SPC | CYMEL 327 | melamine formaldehyde | NC | 1- | 1 | 100 |
| 3 | SPA | CYMEL 327 | melamine formaldehyde | NC | 1- | 1 | 100 |
| 4 | SPB | CYMEL 327 | melamine formaldehyde | NC | 1- | 1 | 100 |
| C1 | SPC | EPOMIN SP012 | polyethyleneimine | NC | 1 | 0 | 10 |
| C2 | SPC | STAHL 5305 | isocyanate | slight ppt | 2 | 0 | 10 |
| C3 | SPC | STAHL 5577 | carbodiimide | NC | 1 | 0 | 10 |
| C4 | SPC | CX100 | aziridine | gelled | 3 | 0 | 40 |
| C5 | SPC | CX100[2] | aziridine | slight ppt | 1- | 0 | 10 |
| C6 | SPA | CX100 | aziridine | gelled | 3 | 0 | 10 |

TABLE 1-continued

| Ex. | Binder | Crosslinker | Crosslinker Type | 24 Hour Pot Life | Visual After Stretch | Tool Removal | Crosshatch Adhesion (%) |
|---|---|---|---|---|---|---|---|
| C7 | SPB | CX100 | aziridine | slight ppt | 3 | 0 | 0 |
| C8 | SPB | STAHL 5577 | carbodiimide | NC | 1 | 0 | 0 |
| C9 | RHOPLEX 3208 | none | | NC | 3 | 0 | 0 |
| C10 | RHOPLEX 3208 | none | | NC | 2 | 0 | 0 |

[1]NC = no change visible to the naked eye
[2]CX100 at 10 wt. % with respect to sulfopolyester solids

What is claimed is:

1. An optical article comprising:
   a multilayer optical film, and
   a primer layer disposed on the multilayer optical film, the primer layer consisting of a sulfopolyester, a melamine-formaldehyde crosslinker, a catalyst and a surfactant, wherein the ratio of sulfopolyester to crosslinker is from about 1:1 to about 20:1.

2. The optical article of claim 1, the sulfopolyester comprising a water soluble sulfopolyester or a water dispersible sulfopolyester.

3. The optical article of claim 1, the sulfopolyester comprising:
   one or more dicarboxylic acid monomers selected from the group consisting of sulfonated isophthalic acid, isophthalic acid, and terephthalic acid; and
   one or more diol monomers selected from the group consisting of ethylene glycol, diethylene glycol, neopentyl glycol, and 1,4-cyclohexane dimethanol.

4. The optical article of claim 1, the primer layer having a thickness of from about 30 to about 500 nm.

5. The optical article of claim 1, the primer layer having a Tg of at least about 50° C.

6. The optical article of claim 1, the multilayer optical film comprising a reflective film, a polarizer film, a reflective polarizer film, a diffuse blend reflective polarizer film, a diffuser film, a brightness enhancing film, a turning film, a mirror film, or a combination thereof.

7. The optical article of claim 1, the multilayer optical film comprising alternating layers of first and second optical layers, the first and second optical layers comprising first and second polymers, respectively, the first and second polymers selected from the group consisting of polyethylene terephthalate, polyethylene naphthalate, cellulose triacetate, polypropylene, polyester, polycarbonate, polymethylmethacrylate, polyimide, polyamide, and blends thereof.

8. The optical article of claim 1, further comprising a microstructured layer disposed on the primer layer, wherein the microstructured layer comprises a structured surface having a plurality of microstructures, and the structured surface comprises an outer surface of the article.

9. The optical article of claim 8, the microstructured layer being halogen-free.

10. A display device comprising:
    a display panel,
    one or more light sources, and
    the article of claim 1.

11. A method of making an optical article, comprising:
    coating a primer composition on a multilayer optical film thereby forming a primed multilayer optical film, the primer composition consisting of a sulfopolyester, a melamine-formaldehyde crosslinker, a catalyst and a surfactant, wherein the ratio of sulfopolyester to crosslinker is from about 1:1 to about 20:1; and
    optionally stretching the primed multilayer optical film in at least one direction.

12. The method of claim 11, the primed multilayer optical film having an original length, and wherein stretching comprises stretching the primed multilayer optical film to at least 6 times the original length.

* * * * *